Figure 11:
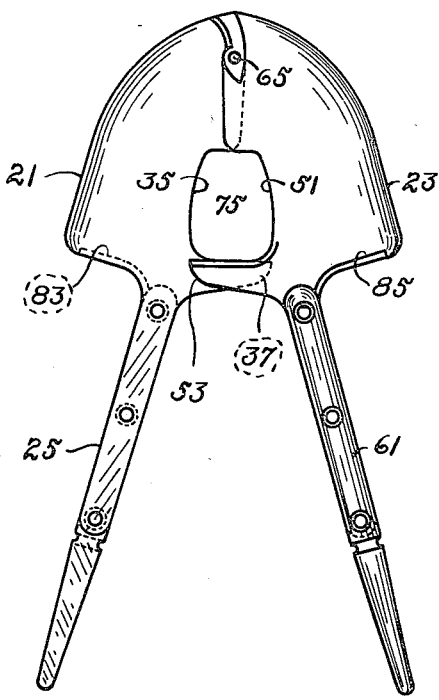

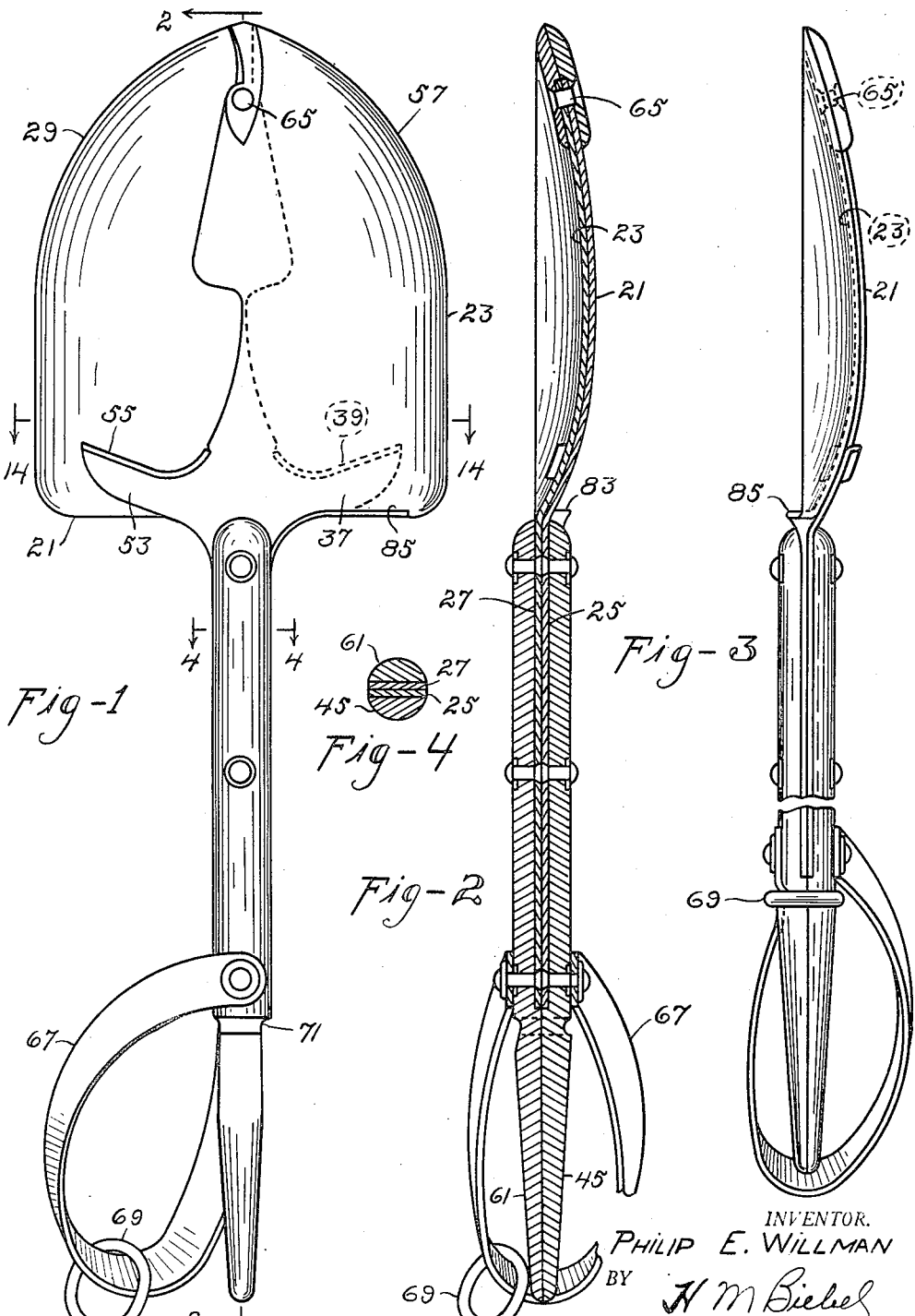

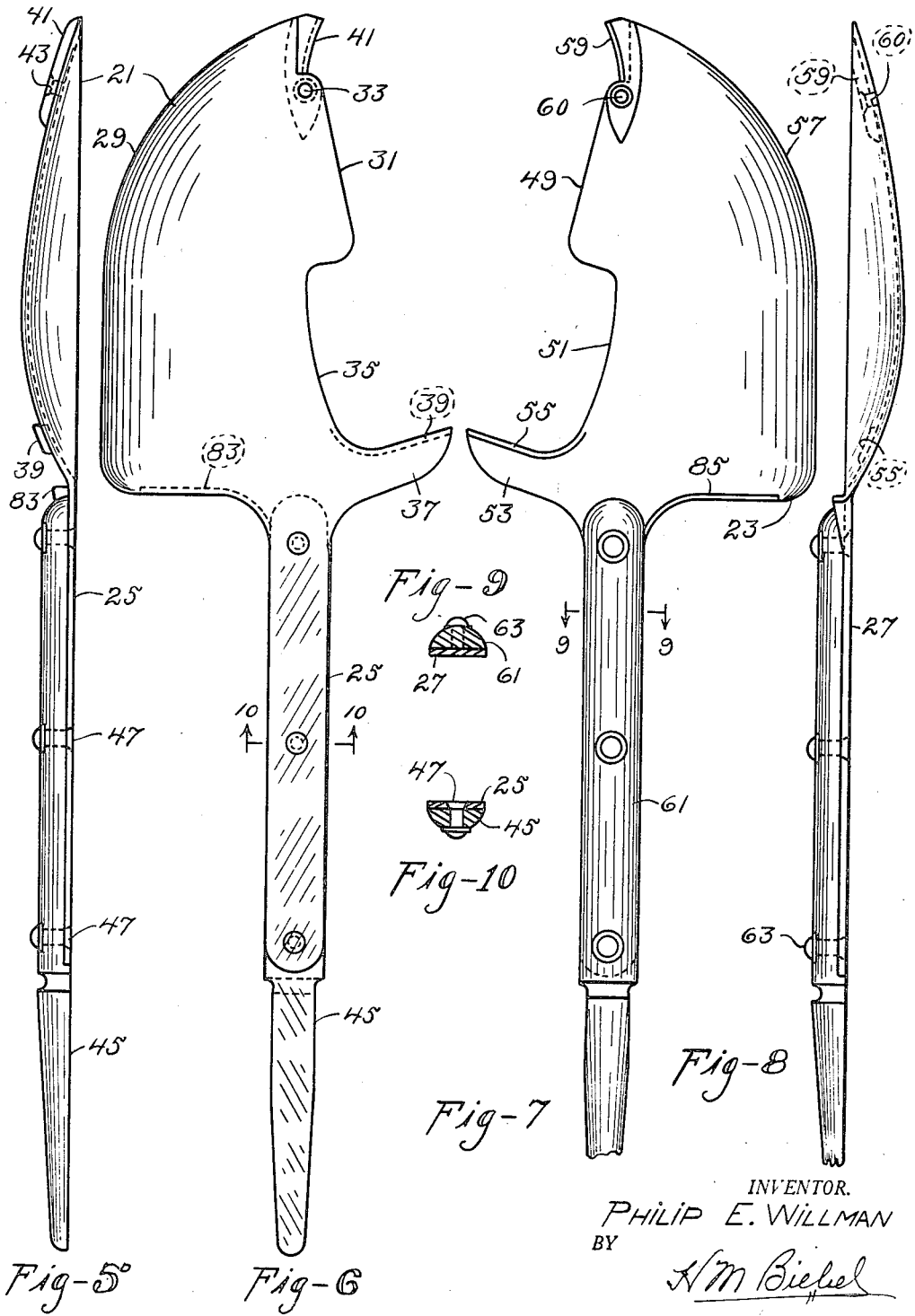

Feb. 6, 1945. P. E. WILLMAN 2,368,792
MILITARY TOOL
Filed Dec. 31, 1942 4 Sheets-Sheet 3

INVENTOR.
PHILIP E. WILLMAN
BY
*H M Biebel*
ATTORNEY

Feb. 6, 1945.     P. E. WILLMAN     2,368,792
MILITARY TOOL
Filed Dec. 31, 1942     4 Sheets-Sheet 4

INVENTOR.
PHILIP E. WILLMAN
BY
H. M. Biebel
ATTORNEY

Patented Feb. 6, 1945

2,368,792

UNITED STATES PATENT OFFICE 2,368,792

MILITARY TOOL

Philip E. Willman, Chicago, Ill., assignor to McGraw Electric Company, Elgin, Ill., a corporation of Delaware Application December 31, 1942, Serial No. 470,743

12 Claims. (Cl. 42—94)

My invention relates to military tools and particularly to combination tools primarily useful as entrenching tools.

An object of my invention is to provide a relatively simple combination tool which can be used as a spade, as a side cutting tool, as a shield and rifle rest and also as a wire-cutting tool.

Other objects of my invention will either be apparent from a description of one form of device embodying my invention or will be pointed out in the course of such description and set forth in the appended claims.

Figure 12:
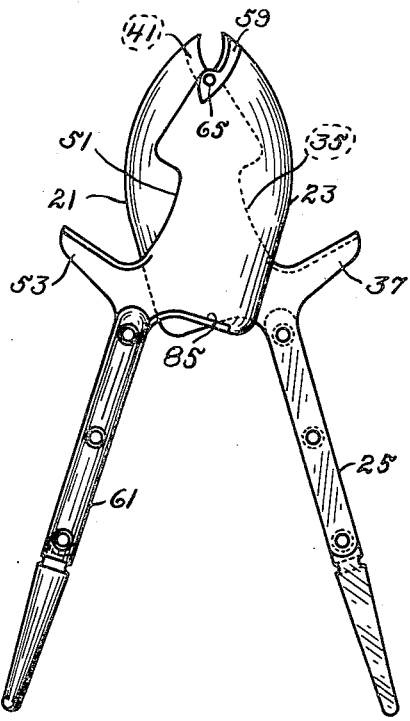
Figure 13:
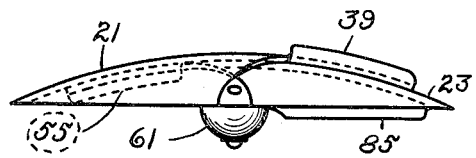
Figure 14:
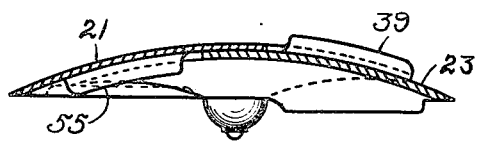
Figure 15:
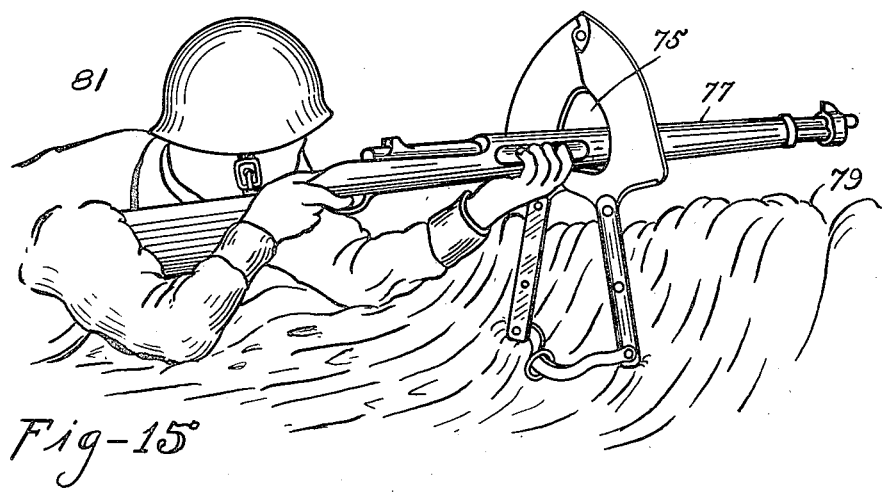
Figure 16:
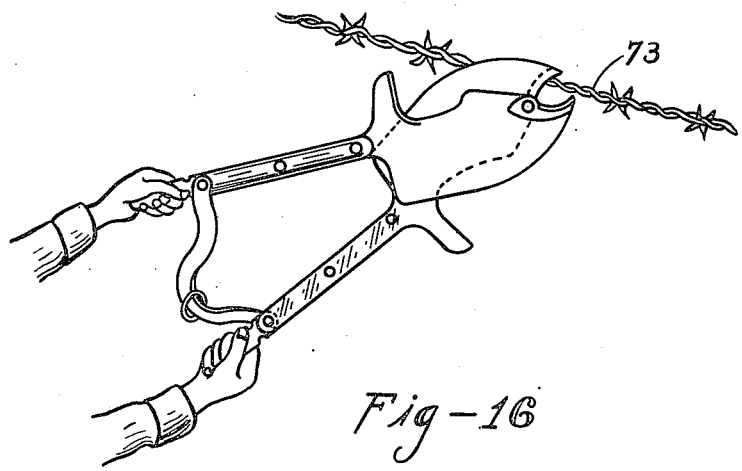

In the drawings,

Figure 1 is a front elevational view of a device embodying my invention,

Fig. 2 is a longitudinal sectional view therethrough, taken on the line 2—2 of Fig. 1, Fig. 3 is a view in side elevation thereof, Fig. 4 is a lateral sectional view thereof taken on the line 4—4 of Fig. 1, Fig. 5 is a view in side elevation of the elements shown in Fig. 6, Fig. 6 is a front elevational view of the lower spade member, Fig. 7 is a view in front elevation of the upper spade member, Fig. 8 is a view in side elevation of the elements shown in Fig. 7, Fig. 9 is a view in lateral section on the line 9—9 of Fig. 7, Fig. 10 is a lateral sectional view on the line 10—10 in Fig. 6, Fig. 11 is a view in front elevation of the main parts of the device embodying my invention when the device is used as a shield and rifle rest, Fig. 12 shows the initial position of the main parts of my military tool when it is used as a wire cutter, Fig. 13 is a top view of the parts shown in Fig. 1, Fig. 14 is a lateral sectional view taken on the line 14—14 of Fig. 1, Fig. 15 shows the device in use as a rifle shield and support, and, Fig. 16 shows the device in use as a wire cutter.

Referring first to Figs. 1 to 4 inclusive, I have there shown a military combination tool embodying my invention and comprising a lower shovel or spade blade 21 and a complementary upper spade blade 23. Each of these blades has preferably, but not necessarily, integral therewith a handle extension 25 and 27 respectively, which extensions are relatively narrow and of sufficient length for a purpose to be hereinafter set forth.

Referring now to Figs. 5 and 6 of the drawings, I have there shown the spade blade 21 and the handle extension 25 thereon by themselves. It will be noted that the left-hand edge 29 of the blade 21 has substantially the form of the ordinary pointed spade or shovel. The right-hand edge of the blade 21 has a special form in that it comprises an upper substantially straight portion 31 extending angularly beyond the center line defined by the handle extension 25 and a pivot aperture 33 to which reference will hereinafter be made in greater detail. The right-hand edge of the blade 21 has also a recess 35 therein, said recess extending from substantially the middle of the longitudinal length of the blade toward the handle end and merging into a lug or extension 37, which extends appreciably toward the right from the center line of the spade. It is to be noted also that the upper or inner edge part of the extension 37 is bent in a given direction to provide a strengthened supporting ledge 39 to operate as a strengthened rifle rest.

The pointed end of the spade blade 21 has rigidly secured thereto one jaw 41 of preferably high-grade cutting steel, this element 41 constituting one jaw of a wire cutter and being provided with an aperture 43 registering with the aperture 33 to receive a pivot pin.

A handle 45, which may be made of wood but may also be made of any other electric-insulating material, is secured to the handle extension 25 by a plurality of rivets 47. It may be noted that the shape of the handle 45, particularly at that part where it engages the extension 25, is substantially semi-cylindrical and that the outer end thereof is of slightly wedge shape for a purpose which will hereinafter appear.

Referring now to Figs. 7, 8 and 9, I have there shown the upper spade-blade 23, which it may be noted, is of substantially complementary shape to spade-blade 21. Its left-hand edge includes a substantial angularly-extending straight portion 49 near the pointed end thereof merging into a recess 51 which in turn merges into a lug 53 having a part of its inner edge portion bent to provide a strengthened rifle rest 55. The right-hand edge 57 of blade 23 is of substantially the same general shape as that of the ordinary shovel or pointed spade blade. A cutting jaw member 59 complementary to jaw 41 is properly secured to the pointed end of the blade 23.

A pivot aperture 60 is provided in blade 23 and in jaw member 59.

Handle extension 27 has secured thereto a handle 61 which may be made of wood but may also be made of electric-insulating material. The handle member 61 is secured to extension 27 by a plurality of rivets 63 and it is to be noted that the handle 61 is of semi-cylindrical shape in lateral section, so that when the two handle portions are alined relatively to each other, as shown for instance in Figs. 3 and 4 of the drawings, the user thereof will have a substantially cylindrical handle for the spade.

The two spade blades 21 and 23 are pivotally connected to each other by a bolt or preferably a rivet member 65 and when the two handle extensions 25 and 27 and the handles 45 and 61 are co-axially superposed, as shown for instance in Fig. 1 of the drawings, the inner edge portions of the spade-blades 21 and 23 overlap each other to form substantially a solid-surface pointed spade-blade.

I provide a carrying and handle-movement limiting means in the shape of a strap 67, the two ends of which are connected to the lower or outermost portion of the extensions 25 and 27 or to the handle portion immediately adjacent thereto, as shown in Figs. 1, 2 and 3 of the drawings. Any suitable or desired means in addition to one of the rivets 47 and 63 may be employed for properly holding the strap ends to the handle.

I provide also a clamping ring 69 which is normally mounted on or carried by the strap 67 as by threading the strap therethrough and the handle portions 45 and 61 are individually provided with peripheral grooves 71 of such depth as to receive the clamping ring 69. I have shown the clamping ring located in proper operative position around the two handle portions 45 and 61, in Fig. 3 of the drawings, and it will be noted that the clamping ring 69 extends around the strap 67 whereby a resilient effect is obtained useful in making sure that the clamping ring 69 will be retained in its proper operative position in the grooves 71 irrespective of the position occupied by the spade or shovel.

I prefer to make the clamping ring 69 of generally oval-shape, so that it is relatively easy to locate it in its clamping position, as shown in Fig. 3, by moving it longitudinally of the outer tapered ends of handles 45 and 61 and the strap or band 67, displaced peripherally from its final peripheral position by about 90°, until longitudinally lined with the grooves 71 and then peripherally turning the ring 69 through about 90° when it will tightly clamp the strap 67 into the groove 71 and hold the two handles in close operative engagement with each other. Turning the ring through about 90° will release it from its clamping engagement and permit it to move off the handles.

The curved outer edge portions of the two blades and particularly the portions 29 and 57 are sharpened whereby the shovel, when in the condition shown in Figs. 1 and 2 of the drawings, is adapted to be used as a double-edged side cutting tool as in the removal of brush, creepers or under-wood encountered by soldiers when advancing in dense undergrowth.

Reference to Fig. 12 of the drawings shows the position of the two main parts of the tool, the strap having been omitted from the drawings for the sake of clearness, when the tool is to be used as a wire cutter. It will be noted that the upper shovel or spade-blade 23 and the parts rigidly connected therewith have been moved to the left of the complementary and cooperating spade blade 21 to thereby open or separate the cutting jaws 41 and 59, the tool now being ready to have the handles moved closer to each other to effect cutting of any wire or other similar member or element. Fig. 16 of the drawings shows the use of the device as a wire cutter on a barbed wire strand 73 by a soldier.

Referring now to Figs. 11 and 15, I have there shown the tool embodying my invention as being used as a shield, the handle of the upper spade blade 23 being now located at the right of the handle of spade blade 21 to thereby provide a rifle opening 75 consisting more particularly of the two recesses 35 and 51. The lugs 37 and 53 are now located at substantially the same height to operate as a rest for a rifle 77 in use by a soldier, marine or other user. I have shown an embankment 79 worked up by a soldier 81, which is effective in better concealing him and the two handles have been forced down into the ground when spaced apart as shown to support the two blades above the embankment and cause them to operate as a shield while the gun or rifle extends through the device as shown.

I wish to point out that while the device embodying my invention is primarily adapted to be used as a shield and a rifle or gun rest when the blades are in the relative positions shown in Figs. 11 and 15, the device may also operate as a gun rest when the handles are separated as shown in Fig. 12, the gun being adapted then to rest on only one of the projections or rests 37 and 53.

I wish to point out further that the handle-end portions of the two spade blades 21 and 23 are individually provided with bent-over edge portions 83 and 85 respectively to permit of a soldier or user stepping on the spade blade, either one or the other, when it is desired to use the tool as an entrenching shovel or spade.

While I have hereinbefore stated that the sharpened outer edge portions of the respective blades may act as a cutting means when desiring to move forward in dense entangled undergrowth, it is to be noted that these portions may also be used as an offensive or defensive tool in hand-to-hand fighting.

Various modifications may be made in the device embodying my invention without departing from the scope and spirit thereof and I desire that all such embodiments clearly coming within the scope of the appended claims shall be considered to be covered thereby.

I claim as my invention:

1. A military tool comprising two complementary spade-blades adapted to normally partially overlap to be operable as a spade, a handle secured to each blade, each handle being of substantially semi-cylindrical cross-sectional shape and the two handles cooperating with each other to fit an operator's hand and a reenforced pivot member mechanically pivotally connecting the two blades near their pointed ends.

2. A military tool comprising two complementary spade-blades adapted to normally partially overlap to be operable as a spade and having pointed outer ends, an elongated extension on each of said blades at the handle end thereof, handles of substantially semi-cylindrical shape and of electric-insulating material secured to the respective extensions, the extensions and the handles thereon being complementary to fit an operator's hand and a reenforced pivot structure connecting the blades a short distance from the pointed ends thereof operable by the handles to cause that part of the two blades beyond the pivot to operate as a wire cutter.

3. A military tool comprising two complementary pointed spade-blades, an elongated extension on each of said blades at the handle end thereof, a handle of substantially semi-cylindrical shape secured to each of said extensions, the extensions and the handles being complementary to each other to fit an operator's hand, a pivot structure on said blades inwardly from the pointed ends thereof, peripheral grooves in said handles, a carrying strap having its ends secured to the respective handles and a handle clamping ring on said strap adapted to fit into said handle grooves to hold the handles and the spade-blades in cooperative positions relative to each other when using the tool as a spade.

4. A military tool comprising two complementary spade-blades having pointed outer ends, handles of electric-insulating material on the respective blades, a reenforcing pivot structure on said blades within the pointed ends of the blades, the reenforcement extending from the pivot to the pointed ends of the blades and adapted to operate as a wire cutter, movement of the handles away from each other in one direction effecting opening of the wire cutter and substantially complete overlap of the blades and movement of the handles away from each other in the opposite direction effecting closure of the wire cutter and movement of the blades away from each other to cause them to operate as a shield for a soldier behind them.

5. A combined military tool and gun rest, comprising two complementary spade-blades each having an inner edge of irregular shape comprising a recess positioned intermediate the length of the inner edge and a projecting lug adjacent the handle end of the blade, pivot means on said blades near the outer ends thereof, handles on the respective blades normally adapted to overlap each other to cause the blades to assume overlapping and recess-covering positions relatively to each other and effect use of the tool as a spade, relative movement of the handles away from each other in a given direction causing a decrease in the amount of overlap of the blades and substantial overlap of the lugs below the opening formed by the recesses located in side-by-side position, the separated handles inserted into the ground being adapted to support the blades and cause them to act as a shield for a soldier therebehind and the lugs constituting a support for a rifle extending through the recesses.

6. A military tool comprising a pair of complementary pointed spade blades, a pivot structure pivotally connecting the pair of blades and comprising relatively heavy cutting jaws secured to the inner edge of each blade at the pointed end thereof and a pivot pin extending through said jaws at the inner ends thereof, a handle on each blade, said handles adapted selectively to overlap to cause the blades to overlap and cooperatively form a spade of the usual shape and to be spaced apart in a predetermined direction to cause the blades to form a shield for a soldier behind them and to be spaced apart in the opposite direction to cause the jaws of the pivot structure to be operable as a wire cutter.

7. A military tool comprising two complementary spade-blades having pointed ends, adapted to normally partially overlap each other for use as a spade, a handle secured to each blade and pivot means mechanically pivotally connecting the two blades near their pointed ends.

8. A military combined tool and gun rest comprising two complementary spade-blades adapted to normally partially overlap each other for use as a spade, a handle secured to each of the blades, a pivot structure mechanically connecting the two blades and lateral projections on the blades selectively operable singly and in combination to support a gun when the handles are separated.

9. A combined military tool and gun rest comprising two complementary spade-blades, a handle secured to each of the blades, a pivot structure mechanically connecting the two blades adjacent their ends opposite to the handle end and oppositely-extending lateral projections on the respective blades adapted to support a gun when the handles have been pivotally moved relatively to each other a predetermined amount.

10. A combined military tool and gun rest comprising two complementary spade-blades, a handle on the respective blades, the inner edge of each blade having a recess and a laterally projecting lug near its handle end, a pivot structure connecting the two blades near their ends opposite the handle ends, said laterally projecting lugs being adapted to operate cooperatively as a gun rest when the handles have been pivotally moved away from each other a predetermined amount in a predetermined direction.

11. A combined military tool and gun rest as set forth in claim 10 and including a strap connected to the two handles operable as a tool-carrying means and to limit the pivotal movement of the handles.

12. A combined military tool and gun rest as set forth in claim 10 and including a strap connected to the two handles operable as a tool-carrying means and to limit the pivotal movement of the handles and a handle-clamping ring on said strap.

PHILIP E. WILLMAN.